United States Patent [19]

Mertens et al.

[11] 4,435,043

[45] Mar. 6, 1984

[54] COMPOSITE MIRROR PANELS

[75] Inventors: Guy Mertens, Namur; Pierre Laroche, Ham-sur-Heure, both of Belgium

[73] Assignee: Glaverbel, Brussels, Belgium

[21] Appl. No.: 374,908

[22] Filed: May 4, 1982

[30] Foreign Application Priority Data

Aug. 21, 1981 [GB] United Kingdom ................. 8125665

[51] Int. Cl.³ ........................... G02B 5/10; B32B 3/28
[52] U.S. Cl. .................................... 350/288; 126/438; 428/182; 428/186; 428/332
[58] Field of Search .............. 428/182, 184, 186, 332; 126/438; 350/295, 299, 310, 320, 288

[56] References Cited

U.S. PATENT DOCUMENTS 4,124,277 11/1978 Stang .................................... 350/293

Primary Examiner—Paul J. Thibodeau
Attorney, Agent, or Firm—Spencer & Frank

[57] ABSTRACT

A composite mirror panel comprises a front flexible vitreous sheet 1 whose rear face is provided with a reflective coating 2 to form a mirror 3. A flexible waterproof backing sheet 5 is watertightly bonded at 4 to the rear of the mirror 3 to form a laminate 6. A corrugated backing sheet 8 is bonded to the first backing sheet 5 along crests 9 of the corrugations to form a composite mirror panel which is flexible about axes parallel with the corrugations.

The first backing sheet 5 may be of vitreouus material thicker than the mirror sheet 1 or it may be a metal sheet.

18 Claims, 4 Drawing Figures

COMPOSITE MIRROR PANELS

BACKGROUND OF THE INVENTION

This invention relates to composite mirror panels.

Composite mirror panels are useful for many purposes and an increasing use is being found in the field of solar energy collectors.

In one form of solar energy transducing installation, mirrors are held on supports distributed around a field. Each support may carry mirrors several square meters in area and there may for example be a hundred or more supports distributed around a field up to a few hectares in area. All the mirrors are arranged to reflect solar energy onto for example an energy collecting surface of a steam generator arranged to drive a turbo-generator. So that the mirrors can continue to reflect sunlight onto the energy collecting surface as the sun moves across the sky, the mirror supports incorporate means for adjusting the orientation of the mirrors about vertical and horizontal axes. The combination of such a mirror and support is known as a heliostat. Such mirrors may be flat or curved.

The efficiency and cost of such a solar energy transducing installation will depend on a number of factors, inter alia, the properties of the heliostat mirrors.

It is clearly desirable that a solar mirror, whether for use in a heliostat or some other form of solar energy collector, should have a high reflectivity, and that such reflectivity should be preserved against weathering to give the mirror a long useful life. It is also desirable that the mirror should be substantially rigid when in use. A heliostat mirror may, e.g. be located a hundred meters or more away from the collector, in which case even quite minor movement or deformation of the mirror due to wind gusts would deflect the reflected sunlight away from the collector surface.

The requisite properties of rigidity and weathering resistance can best be achieved by combining a mirror with a protective and strengthening backing means which together with the mirror forms a composite mirror panel. Composite mirror panels having such properties are useful not only for solar reflectors but also for other purposes, for example for use as building panels.

It is known, for example from U.S. Pat. No. 4,124,277, assigned to Martin Marietta Corporation, to form a composite concave mirror panel by holding a normally flat rigid glass mirror in a concave configuration under bending stress within its elastic limit by bonding it to a holding layer of substantially dimensionally stable material, the holding layer being formed by a layer of open-ended expansible cellular material sandwiched between layers of pliable and solidifiable dimensionally stable material. The holding layer is cured in situ and bonded to the glass mirror while the mirror is mechanically held in the required concave configuration. Aluminium and paper honeycomb structures are cited as examples of suitable cellular material. It is also known to form flat mirrors of the same composite structure.

Concave mirrors made in this way must be made so that each mirror has a predetermined curvature, within such manufacturing tolerances as may be allowed for their intended use. In the case of solar mirrors, such tolerances are very small. In the manufacture of curved mirrors comprising a reflectively-coated glass sheet held in flexed condition, the glass sheet is held pressed against a mould face or die of the required mirror curvature. It is therefore necessary when making concave mirrors of the aforesaid known construction to use a different mould or die for each different mirror curvature, even if such curvatures differ only slightly. When making mirrors for solar reflection purposes, eg for use as solar concentrators, mirrors of an appreciable number of different curvatures may be required.

SUMMARY OF THE INVENTION

It is an object of the present invention to provide a mirror panel of a construction such that its surface profile can be varied, but which can nevertheless easily be secured to a rigid supporting structure so that the panel is held to a predetermined curvature and has a good resistance to flexure under externally applied forces. At the same time, it is an object of the invention to provide such a panel which has good weathering resistance and is therefore suitable for outdoor use, eg as a solar energy reflector.

According to the present invention, there is provided a composite mirror panel comprising a front flexible vitreous sheet whose rear face is provided with a reflective coating to form a mirror, a flexible waterproof backing sheet (hereafter called "first backing sheet") water-tightly bonded to the rear of said mirror so as to form therewith a laminate, and a corrugated backing sheet which is bonded to said first backing sheet along crests of such corrugations to form a said composite panel which is flexible about axes parallel with said corrugations.

Such a composite mirror panel presents a number of important advantages as regards its ease of manufacture and in use.

The present invention enables the construction of a mirror panel whose reflective surface is flexible about axes parallel with the corrugations. Such a mirror panel can very easily be mounted rigidly, for example in a support which comprises ribs or joists leading across the corrugations. Because of the flexibility of the panel, the manufacturer is not committed to the same degree of accuracy in manufacturing mirror panels to a given curvature, since, by virtue of the flexibility, at least minor modifications to such curvature can be made in situ when securing the composite mirror panel to its support for use. Indeed, if the degree of flexibility is sufficient, such mirror panels can be made to a single reflective surface profile and this profile can then be modified on site to give composite mirror panels having a range of different curvatures. This is particularly valuable in manufacture.

The strength of the said second backing sheet can readily be selected so that the composite mirror panel as a whole is substantially inflexible about axes normal to the corrugations, or it may be such as to admit of some degree of flexure about such axes if that is desired.

It is especially preferred that said laminate is a flat laminate when unstressed. It is very much easier to laminate flat sheets together than it is to laminate curved sheets. The production of flat mirror panels which can be curved in situ also has advantages in ease of stacking, packaging and transport prior to mounting in a support.

The laminating of the mirror to the first backing sheet prior to the production of the composite mirror panel is advantageous because it reduces the risk of breaking the front vitreous sheet during formation of the panel. Such risk would otherwise be appreciable when a thin vitreous sheet of large area is used. The production of the said laminate prior to its use in the formation of the panel is also beneficial because it enables separate attention to be given to the highly important bond between the mirror and the first backing sheet. In the finished product, the first backing sheet protects or assists in protecting the reflective coating against deterioration due to weathering.

The field of primary interest for employment of the present invention is that of solar reflectors and particularly solar concentrators, that is, concavely curved solar reflectors.

Preferably said front vitreous sheet has a thickness of at most 1.5 mm and preferably within the range 0.6 to 1.0 mm. In addition to promoting lightness of the panel, this feature has the advantage of enhancing reflectivity of the panel since the light path through the vitreous material will be shorter than when thicker sheets are used so that less energy is absorbed by the vitreous sheet, and the perceptibility of double images due to reflection from the front and back surfaces of the vitreous sheet is also reduced.

Advantageously each said backing sheet is of a material which has a Young's modulus of elasticity of at least 10 and preferably at least 50 $GN/m^2$. This promotes rigidity of a composite panel structure formed in accordance with the invention. In addition, the use of such a sheet as the first backing sheet is advantageous for imparting good support and protection against breakage to the front vitreous sheet during handling preparatory to bonding of the corrugated backing sheet.

The backing sheets can be made of various materials, for example fibre-reinforced plastics materials, especially glass-fibre-reinforced plastics materials, and they may be of the same or different materials.

In some preferred embodiments of the invention, said first backing sheet is a vitreous sheet which is thicker than said front vitreous sheet. Vitreous backing sheets can easily be formed to a high degree of planeity for the manufacture of flat laminates.

In other preferred embodiments of the invention, said first backing sheet is a metal sheet. Alternatively or in addition it is preferred that said corrugated backing sheet is a metal sheet. The or at least one said metal sheet is preferably of steel or aluminium or an aluminium alloy. Where steel is used, it is preferably galvanised to protect it against corrosion. Further protection against corrosion may be given by applying other protective coatings to metal sheets when used; for example, an exposed face of a said backing sheet, where this is of steel, may be coated with a silicone polyester.

To provide a good compromise between strength and weight, the or at least one said metal sheet preferably has a thickness in the range 0.5 to 1.5 mm.

Preferably said front vitreous sheet and said first backing sheet are so selected and bonded together that the flexible laminate has a neutral bending surface which lies outside the thickness of the front vitreous sheet when the laminate is flexed within the elastic limits of its component sheets to form a concave or more concave reflector.

Because the neutral bending surface of the laminate lies outside the thickness of the front vitreous sheet, that sheet will be subjected to compression forces and not tensile forces when the sheet is so flexed. As is well known, vitreous materials are generally able to withstand compressive forces better than tensile forces without breaking, so that the composite mirror panel of which such a laminate forms part can be flexed to a smaller radius of curvature.

One especially preferred way of making such a flexible laminate is to constitute it as a flexible radiant energy reflector as described in published British Patent Application Specification No GB 2 042 761 A whose disclosure is specifically incorporated into this specification by reference.

The corrugations of said corrugated backing sheet may have any desired form, for example they may be rounded or sinusoidal or of rectangular form, but it is preferred that said corrugated backing sheet has non-reflex trapezoidal corrugations. Such corrugations provide convenient flat crests or ridges at either side of the sheet for attachment to the first backing sheet and a mirror panel support. The webs of the corrugated sheet joining such crests are non-reflexly, that is obtusely, angled to the crests to provide the best mechanical properties for the purposes in view.

Advantageously, each crest at either side of such a corrugated backing sheet has the same width which is different from the common width of the crests at the other side of the corrugated backing sheet, and said first backing sheet is bonded to the narrower crests.

The two backing sheets may be bonded together in any convenient way. It is to be noted however that such bonding techniques as spot-welding tend to provide localised stress concentrators which can deform the reflective surface when the composite mirror panel is flexed after assembly. Indeed, the mere act of spot-welding may itself deform the first backing shet and thus also deform the reflective surface of an adherent mirror. In order to avoid or reduce this problem, it is preferred that said first backing sheet is glued to said corrugated backing sheet.

Advantageously means for mounting the panel to a support are provided by or attached to the corrugated backing sheet. For example studs or nuts may be attached to the rear face of the corrugated backing sheet or holes may be drilled therethrough for the reception of bolts.

In the most preferred embodiments of panel according to this invention, said panel mounting means are only indirectly connected to said first backing sheet. This reduces the risk of high local stresses, which could deform the first backing sheet, being transmitted to it directly.

The invention includes a solar energy collector characterised in that it comprises at least one mirror panel as herein defined mounted on a support. Such a mirror panel is preferably mounted in a heliostat. In some preferred embodiments of the invention, the or at least one said mirror panel is held concavely curved by its support.

BRIEF DESCRIPTION OF THE DRAWINGS

Examples of panels according to the invention will now be described in greater detail with reference to the accompanying diagrammatic drawings in which.

DETAILED DESCRIPTION OF THE PREFERRED EMBODIMENTS

Figure 1:
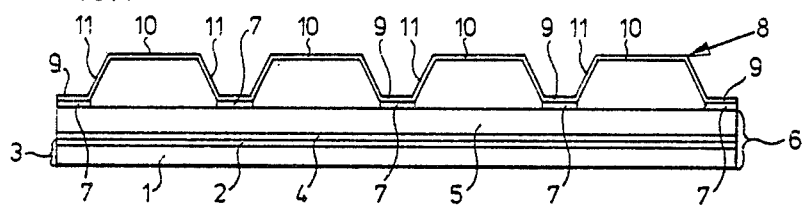
FIGS. 1 and 2 are end elevational views of two mirrors in accordance with the invention.

In FIG. 1, a front glass sheet 1 is provided in known manner with a reflective coating 2, for example of silver, to form a mirror 3. If desired, the back surface of the mirror 3 can be painted in known manner, though this is not shown. The reflectively coated face of the front glass sheet 1 is bonded by a glue layer 4 to a waterproof backing sheet 5 (the first backing sheet) to form a flexible laminate 6. In the embodiment of FIG. 1, the first backing sheet 5 is a glass sheet which is thicker than the first glass sheet 1. The first backing sheet 5 is in turn glued by bodies of adhesive 7 to a corrugated backing sheet 8. As indicated, the corrugations of the corrugated backing sheet 8 are trapezoidal, and the first backing sheet 5 is glued to front flat crests 9 of such corrugations which are all of substantially the same width and are narrower than the rear crests 10. The webs 11 joining the front and rear crests 9, 10 are non-reflexly angled to those crests.

EXAMPLE 1

In a specific practical example, to form a mirror panel measuring 1 by 3 m in area, the front glass sheet 1 was of untempered ordinary soda-lime glass 0.8 mm in thickness and it was silvered in the usual way. The front glass sheet 1 was bonded, using a double-faced adhesive film available under the trade name MACBOND, to the first backing sheet 5 which was also of soda-lime glass but was 3 mm thick. Young's modulus of elasticity for soda-lime glass is approximately 72 $GN/m^2$. The first backing sheet 5 was bonded to the corrugated backing sheet 8 using a silicone adhesive furnished by General Electric. The corrugated backing sheet 8 was made from a 1 mm thick sheet of aluminium alloy available under the trade name and designation ALCLAD 3003H16-18. Young's modulus of elasticity for this alloy is over 65 $GN/m^2$. The corrugated sheet used was manufactured by the SIDAL company under their reference TS 1045. The front crests 9 which were bonded to the first backing sheet 5 were each 30 mm in width and the rear crests 10 were each 90 mm in width. The amplitude of the corrugations was 45 mm and their pitch was 160 mm.

By virtue of the bond between the front vitreous sheet 1 and the first backing sheet 5, the neutral bending surface of the laminate 6 thus formed, that is, the notional lamella within the laminate where compressive and tensile stresses due to flexure are balanced, lies within the thickness of the backing sheet 5 when the laminate is flexed to make the mirror 3 concave. The composite mirror panel of this Example could readily be flexed to give its concave mirror surface a radius of curvature about an axis parallel to the corrugations of 250 m and a radius of curvature of 340 m about an axis normal to the corrugations without any serious risk of damage, and when so bent it was noted that stresses imposed on the laminate 6 by holding the corrugated backing sheet 8 flexed were distributed within the silicone adhesive material 7 so that the mirror was not distorted at the bonding zones.

In a variant of the mirror panel described in Example 1, the two glass sheets 1, 5 were of the same thicknesses but were made of tempered soda-lime glass. Such a mirror panel could be bent to shorter radii of curvature.

Figure 2:
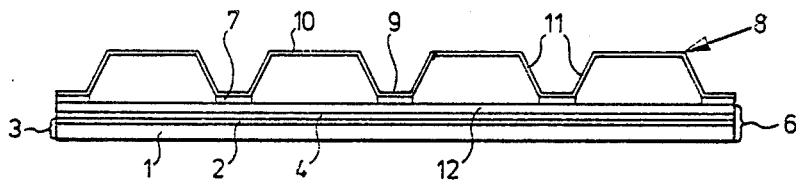

FIG. 2 illustrates an embodiment of composite mirror panel which is adapted for flexing to lower radii of curvature. In FIG. 2, the same reference numerals have been used to designate like elements and it will be noted that the glass backing sheet 5 has been replaced by a thinner backing sheet 12. In this embodiment the backing sheet 12 is of metal.

EXAMPLE 2

A laminate 6 as shown in FIG. 2 was made by bonding a sheet 1 of ordinary untempered glass, 0.75 mm in thickness, to a metal sheet 12 formed of galvanised steel and having a thickness of 0.67 mm. Prior to such bonding the glass ply was provided with a light-reflecting coating 2 of silver and a protective coating composed of a layer of copper and a layer of protective paint as used in conventional mirror production.

The coated glass and the metal sheet were bonded together by a layer of an epoxy-based adhesive marketed under the Trade Mark ARALDITE by Ciba. It was found that the laminate could be flexed within the elastic limit of the metal to impart to the front face of the glass ply a concave curvature as small as 18.5 cm without breakage of the glass. Continued flexing beyond the elastic limit led to breakage of the glass when the radius of curvature reached 12.5 cm.

The laminate 6 was then bonded to a corrugated backing sheet 8 as described in Example 1 and it was found that the mirror panel as a whole could be flexed to give the mirror 3 a uniform concave curvature with a radius as low as 200 m about an axis parallel to the corrugations.

Figure 3:
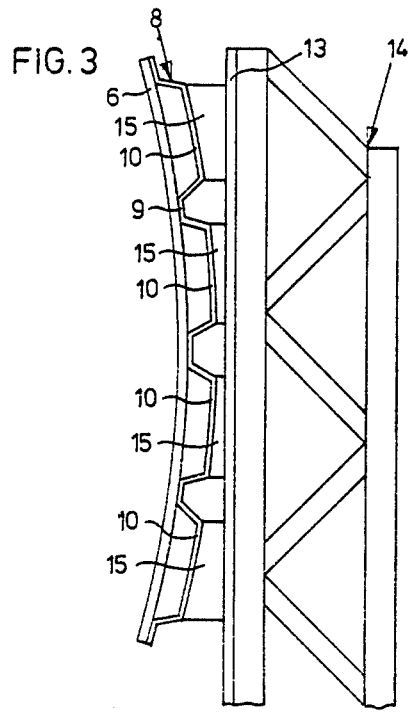
FIG. 3 shows a detail of a mirror panel mounted concavely on a support.

FIG. 3 shows one way in which such a mirror panel can be mounted with a curved profile on a support. In FIG. 3, a composite mirror panel comprising a mirror/backing sheet laminate 6 bonded to a corrugated backing sheet 8 is attached near one of its ends to a flange 13 of a supporting joist 14 of truss construction. In the embodiment illustrated, the flange 13 is straight, so in order to impart the required curvature to the mirror panel, appropriately shaped spacer pieces 15 are interposed between the rear crests 10 of the corrugated backing sheet 8 and the flange 13. The other end of the mirror panel could be likewise attached to a second joist 14. The actual attachment of the corrugated backing sheet 8 to the spacer pieces 15 and the flange 13 can be by bolts, rivets, welding, e.g. spot welding, or by any other convenient means.

Figure 4:
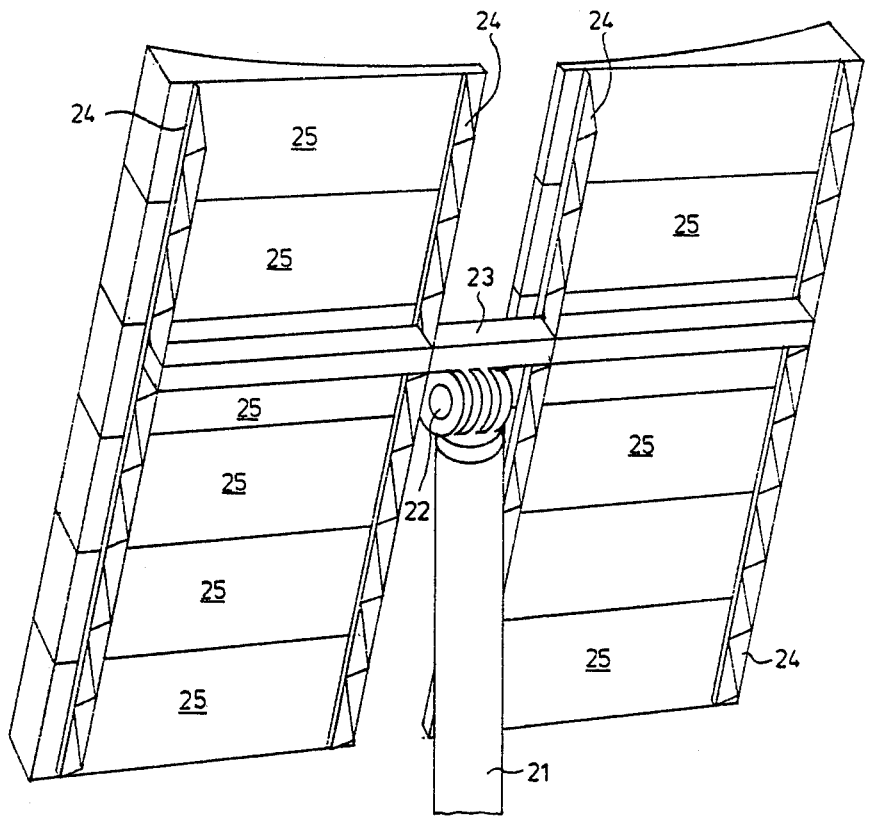
FIG. 4 shows a heliostat support for mounting mirror panels in accordance with the invention.

FIG. 4 shows a heliostat comprising a support carrying mirror panels according to the invention.

The support comprises a pedestal 21 which is held upright in a foundation sunk to a suitable depth in the ground. The upper end of the pedestal 21 carries a drive mechanism 22 which supports a generally horizontal beam 23 on which are fixedly mounted four bar joists 24 to form a double H or H-H rack assembly. The drive mechanism 22 is controlled by known solar tracking control means (not shown) carried by the support to pivot the beam 23 about a generally horizontal axis and about the axis of the pedestal 21. A plurality of generally rectangular composite mirror panels 25 in accordance with the invention are fixed in two columns between the bar joists 24 of the H-H rack assembly. The mirror panels 25 are all substantially identical and each is mounted with its long sides and corrugations generally horizontal and its short sides parallel with the bar joists 24.

In a specific practical example, there are two columns each of six such mirror panels, each panel measuring 1 meter by 3 meters.

The panels may be mounted to form a planar reflector, or, as is preferred, they may be mounted to form a concave reflector.

In another arrangement, the bar joists 24 are themselves curved and the mirror panels are attached between them to form a continuously concave reflector having a generally cylindrical or parabolic-cylindrical surface with a generally horizontal axis of curvature. In yet other arrangements, the beam 23 is bent so that reflected beams of sunlight from the two columns of mirror panels will intersect at a desired distance from the heliostat. And in a still further arrangement, the mirror panels in each column are concavely flexed about an axis parallel to the bar joists supporting that column.

We claim:

1. A composite mirror panel comprising a front flexible vitreous sheet whose rear face is provided with a reflective coating to form a mirror, a flexible waterproof first backing sheet water-tightly bonded to the rear of said mirror so as to form a flexible laminate, and a corrugated backing sheet which is bonded to said first backing sheet along crests of the corrugations to form a said composite panel which is flexible about axes parallel to said corrugations.

2. A panel according to claim 1, wherein said laminate is a flat laminate when unstressed.

3. A panel according to claim 1 or 2, wherein said front vitreous sheet has a thickness of no more than 1.5 mm.

4. A panel according to claim 1, wherein each of said backing sheets is made of a material which has a Young's modulus of elasticity of at least 10 $GN/m^2$.

5. A panel according to claim 1, wherein said first backing sheet is a vitreous sheet which is thicker than said front vitreous sheet.

6. A panel according to claim 1, wherein said first backing sheet is a metal sheet.

7. A panel according to claim 1, wherein said corrugated backing sheet is a metal sheet.

8. A panel according to claim 6 or 7, wherein said metal sheet is made of steel or aluminium or an aluminium alloy.

9. A panel according to claim 6 or 7, wherein said metal sheet has a thickness in the range 0.5 to 1.5 mm.

10. A panel according to claim 1, wherein said front vitreous sheet and said first backing sheet are selected and bonded together such that said flexible laminate has a neutral bending surface which lies outside the thickness of said front vitreous sheet when said laminate is flexed within the elastic limits of its component sheets to form a concave reflector.

11. A panel according to claim 1, wherein said corrugated backing sheet has non-reflex trapezoidal corrugations.

12. A panel according to claim 11, wherein all crests on each side of said corrugated backing sheet have a common width with the common width of the crests on one side being different from the common width of the crests on the other side of said corrugated backing sheet, and wherein said first backing sheet is bonded to the narrower crests.

13. A panel according to claim 1, wherein said first backing sheet is bonded to said corrugated backing sheet by glue.

14. A solar energy collector comprising a support and at least one composite mirror panel according to claim 1 mounted on said support.

15. A solar energy collector according to claim 14, wherein said at least one composite mirror panel is mounted in a heliostat.

16. A solar energy collector according to claim 14 or 15, wherein said at least one composite mirror panel is held concavely curved by its said support.

17. A panel according to claim 3 wherein said front vitreous sheet has a thickness within the range of 0.6 to 1.0 mm.

18. A panel according to claim 4 wherein each of said backing sheets has a Young's modulus of elasticity of at least 50 $GN/m^2$.

* * * * *